US008956758B2

(12) United States Patent
Kawase et al.

(10) Patent No.: US 8,956,758 B2
(45) Date of Patent: Feb. 17, 2015

(54) ANODE ACTIVE MATERIAL AND BATTERY

(75) Inventors: Kenichi Kawase, Fukushima (JP);
Tomoo Takada, Fukushima (JP);
Kensuke Yamamoto, Fukushima (JP)

(73) Assignee: Sony Corporation, Tokyo (JP)

( * ) Notice: Subject to any disclaimer, the term of this patent is extended or adjusted under 35 U.S.C. 154(b) by 718 days.

(21) Appl. No.: 11/555,098

(22) Filed: Oct. 31, 2006

(65) Prior Publication Data

US 2007/0105017 A1    May 10, 2007

(30) Foreign Application Priority Data

Nov. 4, 2005   (JP) ................................ 2005-321015

(51) Int. Cl.
*H01M 4/13*      (2010.01)
*H01M 4/58*      (2010.01)

(52) U.S. Cl.
USPC ...................................................... 429/218.1

(58) Field of Classification Search
None
See application file for complete search history.

(56) References Cited

U.S. PATENT DOCUMENTS

| 6,949,312 B1 * | 9/2005 | Kawakami et al. | ......... 429/218.1 |
| 2004/0185341 A1 * | 9/2004 | Yamamoto et al. | ............ 429/209 |

FOREIGN PATENT DOCUMENTS

| JO | 2004-022507 | 1/2004 |
| JP | HEI 08-124568 | 5/1996 |
| JP | HEI 11-345611 | 12/1999 |
| JP | 2000-311681 | 11/2000 |
| JP | 2002-124254 | 4/2002 |
| JP | 2002-170561 | 6/2002 |
| JP | 2004-022433 | 1/2004 |
| JP | 2004-296386 | 10/2004 |
| JP | 2005-268120 | 9/2005 |
| JP | 2005-285581 | 10/2005 |

OTHER PUBLICATIONS

Japanese Office Action issued Aug. 30, 2011, for corresponding Japanese Appln. No. 2005-321015.
Japanese Patent Office, Notification of reasons for refusal issued in connection with Japanese Patent Application No. 2005-321015, dated Jul. 25, 2012. (7 pages).

* cited by examiner

*Primary Examiner* — Cynthia K. Walls
(74) *Attorney, Agent, or Firm* — K&L Gates LLP

(57) ABSTRACT

An anode active material capable of preventing shape deformation due to expansion and shrinkage and a battery using the anode are provided. An anode active material layer contains a powdery anode active material containing Si or Sn as an element. The average degree of circularity of the anode active material is 0.90 or less. By decreasing the average degree of circularity, the surface area becomes wide, and the reactive region becomes large. As a result, an intense local reaction is prevented, and the number of cracks resulting from expansion and shrinkage are reduced.

20 Claims, 2 Drawing Sheets

ANODE ACTIVE MATERIAL AND BATTERY

CROSS REFERENCES TO RELATED APPLICATIONS

The present application claims priority to Japanese Patent Application JP 2005-321015 filed in the Japanese Patent Office on Nov. 4, 2005, the entire contents of which being incorporated herein by reference.

BACKGROUND

The present disclosure relates to an anode active material containing at least one of metal elements and metalloid elements as an element and a battery using the anode.

In recent years, as mobile devices have been sophisticated and multi-functionalized, a higher capacity of secondary batteries as a power source for these mobile devices has been demanded. As a secondary battery to meet such a demand, there is a lithium ion secondary battery. However, since graphite is used for the anode in the lithium ion secondary battery in practical use currently, the battery capacity thereof is in a saturated state and thus it is difficult to attain a vastly high capacity thereof. Therefore, it is considered to use silicon (Si), tin (Sn), an alloy thereof or the like as an anode active material capable of attributing to a higher capacity (for example, refer to Japanese Unexamined Patent Application Publication No. 2000-311681).

However, in the anode active material using silicon or tin as above, the volume is largely changed associated insertion and extraction of lithium (Li) and the shape is deformed. Therefore, there has been a problem that the charge and discharge characteristics are lower than those of carbon materials, and it is difficult to utilize its characteristics of the high capacity.

SUMMARY

In view of the foregoing, it is desirable to provide an anode active material capable of preventing shape deformation due to expansion and shrinkage and a battery using the anode.

According to an embodiment, there is provided an anode active material in powder state containing at least one of metal elements and metalloid elements as an element, wherein an average degree of circularity is 0.90 or less.

According to an embodiment, there is provided a battery including a cathode, an anode, and an electrolyte, wherein the anode contains a powdery anode active material containing at least one of metal elements and metalloid elements as an element, and an average degree of circularity of the anode active material is 0.90 or less.

According to the anode active material of the embodiment of the invention, the average degree of circularity is 0.90 or less. Therefore, the surface area becomes wide, and the reactive region becomes large. In the result, local intense reaction is prevented, and cracks resulting from expansion and shrinkage can be prevented. Therefore, according to the battery of the embodiment of the invention using the anode active material, shape deformation of the anode can be prevented, and superior charge and discharge characteristics can be obtained.

In particular, when the average particle diameter of the anode active material is 20 μm or less, higher effects can be obtained.

Additional features and advantages are described herein, and will be apparent from, the following Detailed Description and the figures.

DETAILED DESCRIPTION

Figure 1:
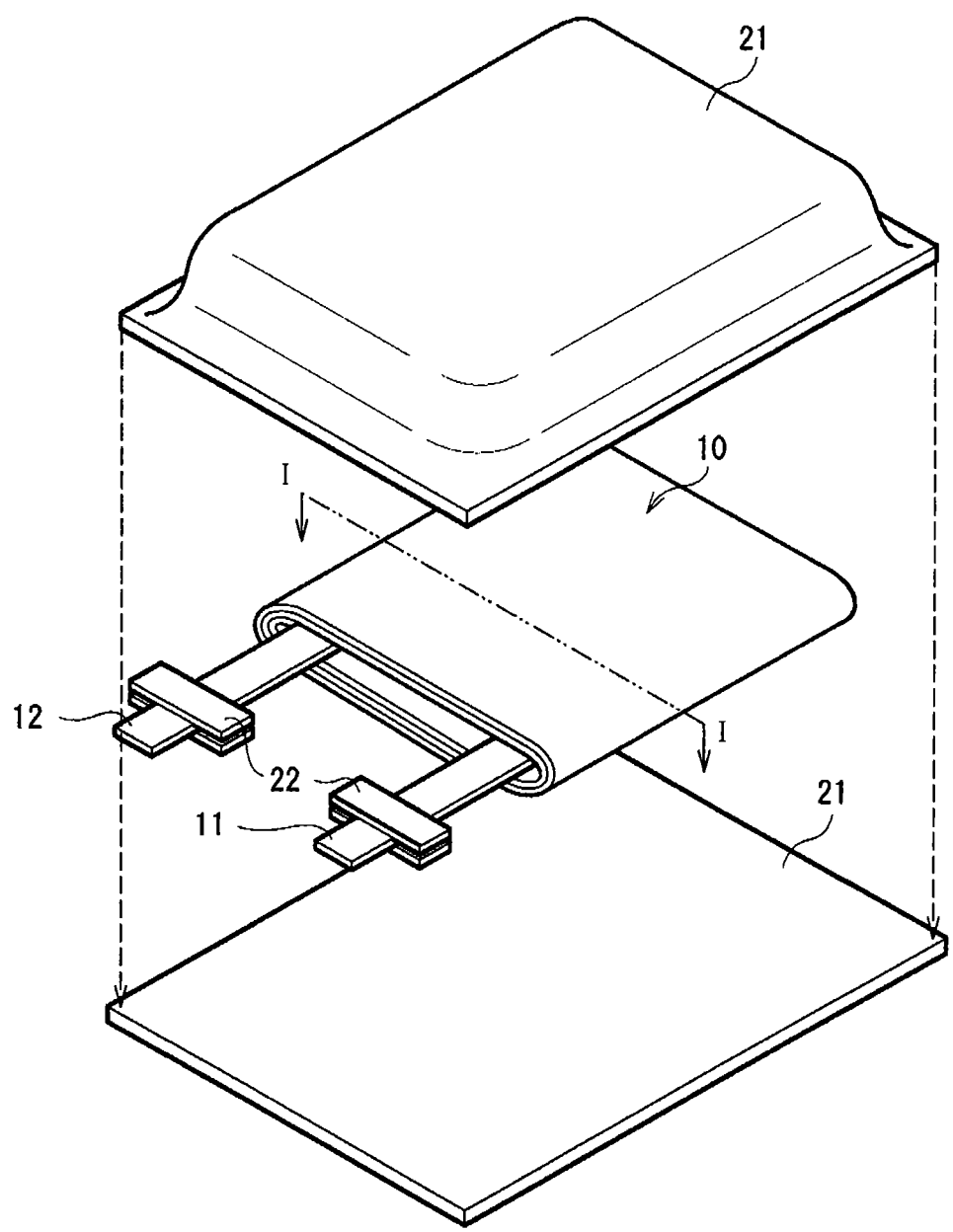
FIG. 1 is a partial exploded perspective view showing a structure of a secondary battery according to an embodiment.

An embodiment of the invention will be hereinafter described in detail with reference to the drawings.

An anode active material according to an embodiment is granular, and contains, for example, at least one of metal elements and metalloid elements capable of forming an alloy with lithium as an element. As a metal element or a metalloid element capable of forming an alloy with lithium, for example, magnesium (Mg), boron (B), arsenic (As), aluminum (Al), gallium (Ga), indium (In), silicon (Si), germanium (Ge), tin (Sn), lead (Pb), antimony (Sb), bismuth (Bi), cadmium (Cd), silver (Ag), zinc (Zn), hafnium (Hf), zirconium (Zr), yttrium (Y), palladium (Pd), or platinum (Pt) can be cited. Specially, metal elements or metalloid elements in Group 14 in the long period periodic table are preferable. Silicon or tin is particularly preferable, since thereby a higher capacity can be obtained.

The anode active material may contain a simple substance, an alloy, or a compound of the metal elements or the metalloid elements. Further, the anode active material may have one or more phases thereof at least in part. In an embodiment, alloys include an alloy of one or more metal elements and one or more metalloid elements in addition to an alloy of two or more metal elements. Further, the alloy may contain a non-metallic element. The texture thereof may be a solid solution, a eutectic crystal (eutectic mixture), an intermetallic compound, or a texture in which two or more thereof exist.

The average degree of circularity of the anode active material is preferably 0.90 or less, more preferably 0.85 or less, much more preferably 0.80 or less, and most preferably 0.75 or less. When the degree of circularity is high, intense reaction is generated on the surface, and cracks easily occur when expanded and shrunk. By decreasing the degree of circularity, the surface area becomes wide, the reactive region becomes large, and thus lithium is inserted more uniformly. In the result, volume change becomes more uniform, and the number of cracks resulting from expansion and shrinkage are reduced. The degree of circularity can be obtained by, for example, calculating a peripheral length and an area from a projected image of a particle, and using Mathematical formula 1.

Degree of circularity=peripheral length of a circle having the same area as that of a projected image of a particle/peripheral length of the projected image of the particle          Mathematical formula 1

The average particle diameter of the anode active material is preferably 20 μm or less, and more preferably 10 μm or less. Thereby, the surface area becomes wide, and higher effects can be obtained. The average particle diameter of the anode active material is preferably 0.3 μm or more, and more preferably 0.5 μm or more. There is a tendency that when the particle diameter is smaller, cracks are hard to be generated. However, when the particles are excessively small and the surface area excessively increases, decomposition reaction of the electrolyte becomes intense.

The degree of circularity of the anode active material can be adjusted by a process such as pulverization. When the particles of the anode active material are formed by vapor-phase deposition method, the degree of circularity of the anode active material can be adjusted by controlling conditions of forming the particles of the anode active material. The average particle diameter of the anode active material can be adjusted by classification or the like.

The anode active material is used for secondary batteries as follows, for example.

FIG. 1 shows a structure of the secondary battery. In the secondary battery, a spirally wound electrode body 10 on which leads 11 and 12 are attached is contained inside a film package member 21. The leads 11 and 12 are respectively directed from inside to outside of the package member 21 and derived in the same direction, for example. The leads 11 and 12 are respectively made of, for example, a metal material such as aluminum, copper, nickel, and stainless, and are in a state of a thin plate or mesh, respectively.

The package member 21 is made of a rectangular aluminum laminated film in which, for example, a nylon film, an aluminum foil, and a polyethylene film are bonded together in this order. The package member 21 is, for example, arranged so that the polyethylene film side and the spirally wound electrode body 10 are opposed to each other, and the respective outer edges are contacted to each other by fusion bonding or an adhesive. Adhesive films 22 to protect from entering of outside air are inserted between the package member 21 and the leads 11 and 12. The adhesive film 22 is made of a material having contact characteristics to the leads 11 and 12, for example, a polyolefin resin such as polyethylene, polypropylene, modified polyethylene, and modified polypropylene.

The package member 21 may be made of a laminated film having other structure, a polymer film such as polypropylene, or a metal film, instead of the foregoing aluminum laminated film.

Figure 2:
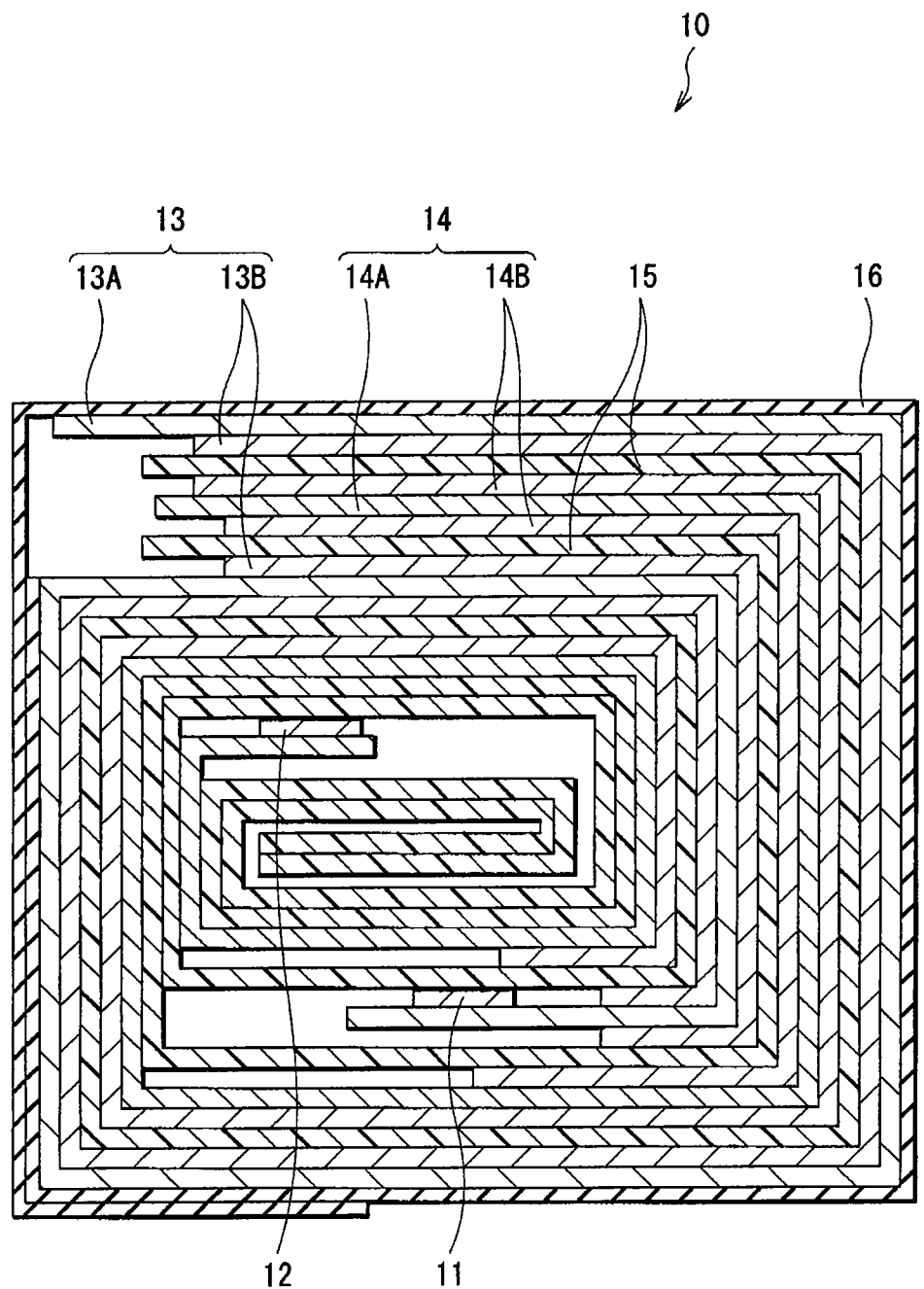
FIG. 2 is a cross section showing a structure taken along line I-I of a spirally wound electrode body shown in FIG. 1.

FIG. 2 shows a cross sectional structure taken along line I-I of the spirally wound electrode body 10 shown in FIG. 1. In the spirally wound electrode body 10, an anode 13 and a cathode 14 are layered and spirally wound with a separator 15 in between. The outermost periphery thereof is protected by a protective tape 16.

The anode 13 has an anode current collector 13A and an anode active material layer 13B provided on the anode current collector 13A. The anode current collector 13A is preferably made of a metal material containing at least one of metal elements not forming an intermetallic compound with lithium. When the intermetallic compound is formed with lithium, the anode current collector is expanded and shrunk due to charge and discharge, structural deformation occurs, and the current collectivity is lowered. In addition, an ability to support the anode active material layer 13B becomes lowered, and thus the anode active material layer 13B becomes easily dropped from the anode current collector 13A. As a metal element not forming an intermetallic compound with lithium, for example, copper (Cu), nickel (Ni), titanium (Ti), iron (Fe), or chromium (Cr) can be cited. Further, as a metal material composing the anode current collector 13A, a material containing a metal element which can be alloyed with the anode active material layer 13B is preferable. Thereby, the contact characteristics between the anode active material layer 13B and the anode current collector 13A can be improved.

The surface roughness Ra of the current collector 13A is preferably 0.1 μm or more. Thereby, the contact characteristics between the anode active material layer 13B and the current collector 13A can be more improved. Further, the surface roughness Ra of the current collector 13A is preferably 3.5 μm or less, and more preferably 3.0 μm or less. When the surface roughness Ra is excessively high, there is a possibility that cracks are easily generated in the anode current collector 13A due to expansion of the anode active material layer 13B. The surface roughness Ra is arithmetic average roughness Ra specified in JIS B0601. It is enough that, the surface roughness Ra of at least a region of the anode current collector 13A on which the anode active material layer 13B is provided falls within the foregoing range.

The anode active material layer 13B contains the anode active material according to this embodiment. If necessary, the anode active material layer 13B may contain other materials such as an electrical conductor, a binder, or other anode active material. The average particle diameter of the anode active material according to this embodiment is preferably within the foregoing range in a full discharge state. Further, in the anode active material, particles may be chemically bonded with each other at the contact points, or may be physically contacted with each other simply, or may be adhered to each other by a binder. Further, the anode active material layer 13B may be alloyed with the anode current collector 13A in at least part of the interface with the anode current collector 13A. Thereby, the contact characteristics between the anode active material layer 13B and the anode current collector 13A can be improved. Specifically, in the interface, the element of the anode current collector 13A may be diffused in the anode active material layer 13B, or the element of the anode active material layer 13B may be diffused in the anode current collector 13A, or the both elements thereof may be diffused in each other. In this application, the foregoing diffusion of elements is regarded as one form of alloying.

The cathode 14 has, for example, a cathode current collector 14A and a cathode active material layer 14B provided on the cathode current collector 14A. The cathode current collector 14A is made of, for example, aluminum, nickel, or stainless steel.

The cathode active material layer 14B contains, for example, as a cathode active material, one or more cathode materials capable of inserting and extracting lithium. The cathode active material layer 14B may contain an electrical conductor such as a carbon material and a binder such as polyvinylidene fluoride according to needs. As a cathode material capable of inserting and extracting lithium, for example, a lithium-transition metal complex oxide containing lithium and transition metals is preferable, since thereby a high voltage can be generated and a high energy density can be obtained. As the lithium-transition metal complex oxide, for example, a compound expressed by a general formula, $Li_xMO_2$ can be cited. M includes one or more transition elements, and for example, preferably includes at least one of cobalt and nickel. x varies according to charge and discharge states of the battery, and is generally in the range of $0.05 \leq x \leq 1.10$. As a specific example of such a lithium-transition metal complex oxide, $LiCoO_2$, $LiNiO_2$ or the like can be cited.

The separator 15 separates the anode 13 from the cathode 14, prevents current short circuit due to contact of the both electrodes, and allows passage of lithium ions. The separator 15 is made of, for example, polyethylene or polypropylene.

An electrolytic solution which is a liquid electrolyte is impregnated in the separator 15. The electrolytic solution contains, for example, a solvent and an electrolyte salt dissolved in the solvent. The electrolytic solution may contain an additive according to needs. As a solvent, for example, a nonaqueous solvent such as ethylene carbonate, propylene carbonate, dimethyl carbonate, diethyl carbonate, ethyl methyl carbonate, 1,3-dioxole-2-one, 4-vinyl-1,3-dioxolane-2-one, and an ester carbonate derivative having halogen atom can be cited. One of the solvents may be used singly, or a mixture of two or more solvents may be used. Specially, at least one of 1,3-dioxole-2-one and 4-vinyl-1,3-dioxolane-2-one is preferably used, since thereby decomposition reaction of the electrolytic solution can be prevented. The ester carbonate derivative having halogen atom is also preferably used, since thereby decomposition reaction of the electrolytic solution can be prevented.

The ester carbonate derivative having halogen atom may be a cyclic compound or a chain compound. However, the cyclic compound is preferable, since thereby higher effects can be obtained. As such a cyclic compound, 4-fluoro-1,3-dioxolane-2-one, 4-chloro-1,3-dioxolane-2-one, 4-bromo-1,3-dioxolane-2-one, 4,5-difluoro-1,3-dioxolane-2-one or the like can be cited. Specially, 4-fluoro-1,3-dioxolane-2-one is preferable, since thereby higher effects can be obtained.

As an electrolyte salt, for example, a lithium salt such as $LiPF_6$, $LiCF_3SO_3$, and $LiClO_4$ can be cited. One of the electrolyte salts may be used singly, or two or more thereof may be used by mixing.

The electrolytic solution may be directly used as it is, or may be used as a so-called gelatinous electrolyte by being held by a polymer. In the latter case, the electrolyte may be impregnated in the separator 15, or may exist as a layer between the separator 15 and the anode 13/the cathode 14. As a polymer material, for example, a polymer containing vinylidene fluoride is preferable, since such a polymer has high redox stability. Further, as a polymer, a compound formed by polymerizing a polymeric compound is preferable. As a polymeric compound, for example, monofunctional acrylate such as acrylic ester, monofunctional methacrylate such as methacrylic ester, multifunctional acrylate such as diacrylic ester and triacrylic ester, multifunctional methacrylate such as dimethacrylic ester and trimethacrylic ester, acrylic nitrile, methacrylic nitrile can be cited. Specially, ester having an acrylate group or a methacrylate group is preferable, since when such ester is used, polymerization proceeds easily and the reaction rate of the polymeric compound is high.

The battery can be manufactured, for example, as follows.

First, for example, the anode active material according to this embodiment, and if necessary an electrical conductor, a binder or the like are mixed to prepare a mixture. The mixture is dispersed in a disperse medium to obtain mixture slurry. The anode current collector 13A is coated with the mixture slurry. The resultant is compression-molded to form the anode active material layer 13B. Next, if necessary, heat treatment may be provided to alloy the anode current collector 13A and the anode active material layer 13B in at least part of the interface thereof. Thereby, the anode 13 is formed.

Further, for example, the cathode active material, and if necessary an electrical conductor, a binder or the like are mixed to prepare a mixture. The mixture is dispersed in a disperse medium to obtain mixture slurry. The cathode current collector 14A is coated with the mixture slurry. The resultant is compression-molded to form the cathode active material layer 14B. Thereby, the cathode 14 is formed.

Next, the anode 13 and the cathode 14 are spirally wound with the separator 15 in between and such a spirally wound body is sandwiched between the package members 21. After that, an electrolytic solution is injected into the package member 21, and then the package member 21 is hermetically sealed. Thereby, the secondary battery shown in FIGS. 1 and 2 is completed. Otherwise, when the electrolytic solution is held by a polymer, a polymeric compound is injected together with the electrolytic solution into the package member 21, the polymeric compound is polymerized inside the package member 21, and thereby a gelatinous electrolyte may be obtained. Otherwise, it is possible that before the anode 13 and the cathode 14 are spirally wound with the separator 15 in between, an electrolyte in which an electrolytic solution is held in a polymer is formed on the anode 13 or the cathode 14.

In the secondary battery, when charged, for example, lithium ions are extracted from the cathode 14 and inserted in the anode 13 through the electrolytic solution. When discharged, for example, lithium ions are extracted from the anode 13 and inserted in the cathode 14 through the electrolytic solution. Here, since the average degree of circularity of the anode active material is 0.90 or less, the reactive region becomes large, and intense local reaction is prevented. Therefore, even if the anode active material is expanded and shrunk due to charge and discharge, shape deformation such as cracks is prevented.

As above, according to this embodiment, since the average degree of circularity of the anode active material is 0.90 or less, the surface area becomes large, the reactive region becomes large, and intense local reaction is prevented. Thus, cracks resulting from expansion and shrinkage can be prevented. Therefore, shape deformation of the anode active material layer 13B can be prevented, and superior charge and discharge characteristics can be obtained.

In particular, when the average degree of circularity of the anode active material is 0.85 or less, preferably 0.80 or less, more preferably 0.75 or less, improved effects can be obtained.

Further, when the average particle diameter of the anode active material is 20 μm or less, further 10 μm or less, and when the average particle diameter of the anode active material is 0.3 μm or more, preferably 0.5 μm or more, improved effects can be obtained.

EXAMPLES

Further, specific examples will be hereinafter described in detail with reference to the drawings. In the following examples, reference numbers and symbols used in the foregoing embodiments are used correspondingly.

Examples 1-1 to 1-15

In Examples 1-1 to 1-3, the laminated film secondary batteries shown in FIGS. 1 and 2 were fabricated by using crystalline silicon particles as an anode active material. At that time, the crystalline silicon particles were pulverized, thereby changing the average degree of circularity to 0.90, 0.85, or 0.80 in Examples 1-1 to 1-3. The average degree of circularity was calculated according to Mathematical formula 1 by using a flow system particle image analyzer. The average degree of circularity was also calculated similarly in examples and comparative examples described later. Further, the average particle diameter of the crystalline silicon particles was adjusted to 5 μm by classification.

In Examples 1-4 to 1-9, the laminated film secondary batteries shown in FIGS. 1 and 2 were fabricated by using amorphous silicon particles as an anode active material. The amorphous silicon particles were formed on a molybdenum substrate with the surface roughened by electron beam vapor deposition method by vapor-phase freezing. At that time, the vapor deposition conditions were adjusted, thereby changing the average degree of circularity of the amorphous silicon particles to 0.90, 0.85, 0.80, 0.75, 0.70, or 0.65 in Examples 1-4 to 1-9. Further, the average particle diameter of the amorphous silicon particles was adjusted to 4 μm by classification.

In Examples 1-10 to 1-12, the laminated film secondary batteries shown in FIGS. 1 and 2 were fabricated by using as an anode active material, a mixture of crystalline silicon particles and graphitized meso-carbon micro beads powder as artificial graphite at a weight ratio of crystalline silicon particles:artificial graphite=50:40. At that time, the crystalline silicon particles were pulverized, thereby changing the average degree of circularity to 0.90, 0.85, or 0.80 in Examples 1-10 to 1-12. The average particle diameter of the crystalline silicon particles was adjusted to 5 μm by classification. Further, the average degree of circularity of the artificial graphite particles was 0.98, and the average particle diameter of the artificial graphite particles was 20 μm.

In Examples 1-13 to 1-15, the laminated film secondary batteries shown in FIGS. 1 and 2 were fabricated by using silicon-titanium-copper alloy particles as an anode active material. The silicon-titanium-copper alloy particles were synthesized by single-roll process. The composition thereof was 60:30:10 at an atomic ratio of Si:Ti:Cu. Then, pulverization conditions were changed, thereby changing the average degree of circularity to 0.90, 0.85, or 0.80 in Examples 1-13 to 1-15. The average particle diameter was adjusted to 10 μm by classification.

In Examples 1-1 to 1-15, the anode 13 was formed as follows. 90 wt % of an anode active material and 10 wt % of polyvinylidene fluoride as a binder were mixed, the resultant mixture was dispersed in a solvent. The anode current collector 13A made of a 15 μm thick copper foil with a surface roughness Ra of 0.3 μm was coated with the foregoing resultant, which was pressed to form the anode active material layer 13B. After that, heat treatment was provided at 200° C. in the argon atmosphere to form the anode 13.

The cathode 14 was formed as follows. Lithium cobaltate ($LiCoO_2$) as a cathode active material, carbon black as an electrical conductor, and polyvinylidene fluoride as a binder were mixed. The resultant mixture was dispersed in a disperse medium. After that, the cathode current collector 14A made of an aluminum foil was coated with the foregoing resultant, which was pressed to form the cathode active material layer 14B. Thereby, the cathode 14 was formed.

Further, a battery was assembled as follows. The anode 13 and the cathode 14 were layered and spirally wound with a microporous polyethylene film as the separator 15 in between. After that, the resultant spirally wound body was sandwiched between the package members 21 made of an aluminum laminated film. An electrolytic solution was injected into the package member 21, the package member 21 was hermetically sealed, and thereby the battery was assembled. As an electrolytic solution, a solution in which $LiPF_6$ as an electrolyte salt was dissolved at a concentration of 1 mol/l in a mixture of ethylene carbonate and diethyl carbonate at a weight ratio of ethylene carbonate:diethyl carbonate=3:7 was used.

As Comparative example 1-1 relative to Examples 1-1 to 1-15, a secondary battery was fabricated in the same manner as in Examples 1-1 to 1-3, except that the average degree of circularity of the crystalline silicon particles as an anode active material was 0.95.

Further, as Comparative examples 1-2 to 1-4 relative to Examples 1-1 to 1-15, secondary batteries were fabricated in the same manner as in Examples 1-1 to 1-15, except that natural graphite particles were used as an anode active material. At that time, the natural graphite particles were pulverized, thereby changing the average degree of circularity to 0.90, 0.85, or 0.80 in Comparative examples 1-2 to 1-4. Further, the average particle diameter of the natural graphite particles was adjusted to 25 μm by classification.

For the fabricated secondary batteries of Examples 1-1 to 1-15 and Comparative examples 1-1 to 1-4, cycle test was performed. In the cycle test, 50 cycles of constant current and constant voltage charge with a current of 500 mA and the upper limit voltage of 4.2 V and constant current discharge with a current of 500 mA and the lower limit voltage of 2.5 V were performed at room temperature. The ratio of the discharge capacity at the 50th cycle to the discharge capacity at the first cycle, that is, (the discharge capacity at the 50th cycle/the discharge capacity at the first cycle)×100(%) was examined. Obtained results are shown in Table 1.

TABLE 1

| | Anode active material | | | |
|---|---|---|---|---|
| | Kind | Average degree of circularity | Average particle diameter (μm) | Discharge capacity retention ratio (%) |
| Example 1-1 | Crystalline Si | 0.90 | 5 | 77 |
| Example 1-2 | | 0.85 | | 79 |
| Example 1-3 | | 0.80 | | 83 |
| Example 1-4 | Amorphous Si | 0.90 | 4 | 76 |
| Example 1-5 | | 0.85 | | 82 |
| Example 1-6 | | 0.80 | | 84 |
| Example 1-7 | | 0.75 | | 87 |
| Example 1-8 | | 0.70 | | 89 |
| Example 1-9 | | 0.65 | | 91 |
| Example 1-10 | Crystalline Si:Artificial graphite = 50:40 (weight ratio) | Si = 0.90 Artificial graphite = 0.98 | Si = 5 Artificial graphite = 20 | 76 |
| Example 1-11 | | Si = 0.85 Artificial graphite = 0.98 | | 79 |
| Example 1-12 | | Si = 0.80 Artificial graphite = 0.98 | | 84 |
| Example 1-13 | SiTiCu alloy | 0.90 | 10 | 80 |
| Example 1-14 | Si:Ti:Cu = 60:30:10 | 0.85 | | 83 |
| Example 1-15 | (atomic %) | 0.80 | | 87 |
| Comparative example 1-1 | Crystalline Si | 0.95 | 5 | 67 |
| Comparative | Natural graphite | 0.90 | 25 | 91 |

TABLE 1-continued

| | Anode active material | | | |
|---|---|---|---|---|
| | Kind | Average degree of circularity | Average particle diameter (μm) | Discharge capacity retention ratio (%) |
| example 1-2 | | | | |
| Comparative example 1-3 | | 0.85 | | 87 |
| Comparative example 1-4 | | 0.80 | | 86 |

As shown in Table 1, according to Examples 1-1 to 1-15 in which the average degree of circularity was 0.90 or less, the discharge capacity retention ratio could be improved compared to Comparative example 1-1 in which the average degree of circularity was higher than 0.90. Further, in Examples 1-1 to 1-15, there was a tendency that as the average degree of circularity was lowered, the discharge capacity retention ratio improved. Meanwhile, in Comparative examples 1-2 to 1-4 in which the natural graphite particles were used as an anode active material, there was a tendency that as the average degree of circularity was lowered, the discharge capacity retention ratio was lowered.

That is, it was found that when the average degree of circularity was 0.90 or less in the powdery anode active material containing at least one of metal elements and metalloid elements as an element, the cycle characteristics could be improved. Further, it was found that the average degree of circularity was preferably 0.85 or less, more preferably 0.80 or less, and much more preferably 0.75 or less.

Examples 2-1 to 2-3

Secondary batteries were fabricated in the same manner as in Examples 1-1 to 1-15, except that tin-copper-cobalt alloy particles were used as an anode active material. The tin-copper-cobalt alloy particles were synthesized by single-roll process. The composition thereof was 50:30:20 at an atomic ratio of Sn:Cu:Co. The average degree of circularity was changed to 0.90, 0.85, or 0.80 by pulverization in Examples 2-1 to 2-3. The average particle diameter was adjusted to 12 μm by classification.

As Comparative example 2-1 relative to Examples 2-1 to 2-3, a secondary battery was fabricated in the same manner as in Examples 2-1 to 2-3, except that the average degree of circularity of the tin-copper-cobalt alloy particles as an anode active material was 0.95. For the fabricated secondary batteries of Examples 2-1 to 2-3 and Comparative example 2-1, cycle test was performed in the same manner as in Examples 1-1 to 1-15. Obtained results are shown in Table 2 together with the results of Comparative examples 1-2 to 1-4.

TABLE 2

| | Anode active material | | | |
|---|---|---|---|---|
| | Kind | Average degree of circularity | Average particle diameter (μm) | Discharge capacity retention ratio (%) |
| Example 2-1 | SnCuCo alloy Sn:Cu:Co = 50:30:20 (atomic %) | 0.90 | 12 | 74 |
| Example 2-2 | | 0.85 | | 80 |
| Example 2-3 | | 0.80 | | 85 |
| Comparative example 2-1 | SnCuCo alloy Sn:Cu:Co = 50:30:20 (atomic %) | 0.95 | 12 | 69 |
| Comparative example 1-2 | Natural graphite | 0.90 | 25 | 91 |
| Comparative example 1-3 | | 0.85 | | 87 |
| Comparative example 1-4 | | 0.80 | | 86 |

As shown in Table 2, in Examples 2-1 to 2-3, there was also a tendency that as the average degree of circularity was lowered, the discharge capacity retention ratio improved as in Examples 1-1 to 1-15. That is, it was found that when the average degree of circularity was 0.90 or less, the cycle characteristics could be also improved in the case that other anode active material containing at least one of metal elements and metalloid elements as an element was used.

Examples 3-1 to 3-9

In Examples 3-1 to 3-9, secondary batteries were fabricated in the same manner as in Example 1-2, except that the average particle diameter of the crystalline silicon particles as an anode active material was changed in the range from 0.3 μm to 30 μm. In Examples 3-7 to 3-9, secondary batteries were fabricated in the same manner as in Example 2-2, except that the average particle diameter of the tin-copper-cobalt alloy particles as an anode active material was changed in the range from 8 μm to 30 μm.

Further, as Comparative examples 3-1 and 3-2 relative to Examples 3-1 to 3-9, secondary batteries were fabricated in the same manner as in Examples 3-1 to 3-9, except that natural graphite particles with the average degree of circularity of 0.85 was used as an anode active material, and the average particle diameter was 30 μm or 10 μm.

For the fabricated secondary batteries of Examples 3-1 to 3-8 and Comparative examples 3-1 and 3-2, cycle test was performed in the same manner as in Examples 1-2 and 2-2. Obtained results are shown in Table 3 together with the results of Examples 1-2 and 2-2, and Comparative example 1-3. For the secondary batteries of Examples 3-1 to 3-8 and Comparative examples 3-1 and 3-2, after full discharged state was obtained by performing 1 cycle of charge and discharge under the foregoing conditions, the secondary batteries were disassembled, and the average particle diameter of the anode active material was measured. In the result, it was confirmed that the measured average particle diameter was almost identical with the average particle diameter adjusted in manufacturing.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

TABLE 3

| | Anode active material | | | |
|---|---|---|---|---|
| | Kind | Average degree of circularity | Average particle diameter (μm) | Discharge capacity retention ratio (%) |
| Example 3-1 | Crystalline Si | 0.85 | 30 | 70 |
| Example 3-2 | | | 20 | 75 |
| Example 3-3 | | | 10 | 76 |
| Example 1-2 | | | 5 | 79 |
| Example 3-4 | | | 2 | 82 |
| Example 3-5 | | | 0.5 | 81 |
| Example 3-6 | | | 0.3 | 73 |
| Example 3-7 | SnCuCo alloy | 0.85 | 30 | 69 |
| Example 3-8 | Sn:Cu:Co = 50:30:20 | | 20 | 75 |
| Example 2-2 | (atomic %) | | 12 | 80 |
| Example 3-9 | | | 8 | 83 |
| Comparative example 3-1 | Natural graphite | 0.85 | 30 | 88 |
| Comparative example 1-3 | | | 25 | 87 |
| Comparative example 3-2 | | | 10 | 84 |

As shown in Table 3, in Examples 3-1 to 3-9, there was a tendency that as the average particle diameter was decreased, the discharge capacity retention ratio improved and then lowered. Meanwhile, in Comparative examples 1-3, 3-1, and 3-2, there was a tendency that as the average particle diameter was decreased, the discharge capacity retention ratio was lowered. That is, it was found that when the average particle diameter was 20 μm or less, further 10 μm or less, and when the average particle diameter was 0.3 μm or more, further 0.5 μm or more in the powdery anode active material containing at least one of metal elements and metalloid elements as an element, the cycle characteristics could be more improved.

It should be appreciated that the invention is not limited to the foregoing embodiments and examples, and various modifications may be made. For example, in the foregoing embodiment and the foregoing examples, descriptions have been given of the case using the film package member 21. However, other embodiments can be similarly applied to a case using a can as a package member. The shape thereof may be any shape such as a coin type, a cylinder type, a square type, a button type, a thin type, and a large type.

Further, in the foregoing embodiment and the foregoing examples, descriptions have been given of the case including the spirally wound electrode body 10 in which the anode 13 and the cathode 14 are spirally wound. However, other embodiments can be similarly applied to a laminated type in which one or a plurality of anode layers and one or a plurality of cathode layers are layered. Further, other embodiments can be applied to primary batteries in addition to the secondary batteries.

It should be understood by those skilled in the art that various modifications, combinations, sub-combinations and alternations may occur depending on design requirements and other factors insofar as they are within the scope of the appended claims or the equivalents thereof.

The invention is claimed as follows:

1. An anode active material in a powder state comprising:
particles consisting essentially of a material selected from the group consisting of silicon and an alloy of silicon,
wherein an average degree of circularity of the particles is less than 90%, and
wherein the particles are chemically bonded with each other at contact points, physically contacted with each other, adhered to each other by a binder, or alloyed with an anode current collector at least in part.

2. The anode active material according to claim 1, wherein an average particle diameter is 20 μm or less.

3. The anode active material according to claim 2, wherein the average particle diameter is 10 μm or less.

4. The anode active material according to claim 2, wherein the average particle diameter is 0.3 μm or more.

5. A battery comprising:
a cathode;
an anode; and
an electrolytic solution,
wherein the anode contains an anode active material in a powder state comprising particles consisting essentially of a material selected from the group consisting of silicon and an alloy of silicon,
wherein an average degree of circularity of the particles is less than 90%, and
wherein the particles are chemically bonded with each other at contact points, physically contacted with each other, adhered to each other by a binder, or alloyed with an anode current collector at least in part.

6. The battery according to claim 5, wherein an average particle diameter of the anode active material is 20 μm or less.

7. The battery according to claim 6, wherein the average particle diameter of the anode active material is 10 μm or less.

8. The battery according to claim 6, wherein the average particle diameter of the anode active material is 0.3 μm or more.

9. The anode active material according to claim 1, wherein the particles consist essentially of a Si:Ti:Cu alloy.

10. The battery according to claim 5, wherein the particles consist essentially of Si or a Si:Ti:Cu alloy.

11. A battery comprising:
a cathode;
an anode; and
an electrolytic solution,
wherein the anode contains an anode current collector and an anode active material in a powder state provided on the anode current collector, the anode active material comprising particles consisting essentially of a material selected from the group consisting of silicon and an alloy of silicon,
wherein an average degree of circularity of the particles is 0.90 or less,
wherein the particles are chemically bonded with each other at contact points, physically contacted with each other, adhered to each other by a binder, or alloyed with an anode current collector at least in part, and
wherein a surface roughness Ra of the anode current collector ranges from 0.1 µm to 3.5 µm.

12. The anode active material according to claim 1, further comprising a carbon material.

13. The battery according to claim 5, wherein the anode active material further comprises a carbon material.

14. The anode active material according to claim 1, wherein the average degree of circularity of the particles is 70% or less.

15. The anode active material according to claim 1, wherein the anode active material exhibits a property that as the average degree of circularity of the particles is lowered, a discharge capacity retention ratio of a battery including the anode active material increases.

16. The battery according to claim 5, wherein the average degree of circularity of the particles is 70% or less.

17. The battery according to claim 5, wherein the anode active material exhibits a property that as the average degree of circularity of the particles is lowered, a discharge capacity retention ratio of a battery including the anode active material increases.

18. The battery according to claim 11, wherein the average degree of circularity of the particles is 0.70 or less.

19. The battery according to claim 11, wherein the anode active material exhibits a property that as the average degree of circularity of the particles is lowered, a discharge capacity retention ratio of a battery including the anode active material increases.

20. The anode active material according to claim 1, wherein the particles are monolithic particles.

* * * * *